Figure 1:
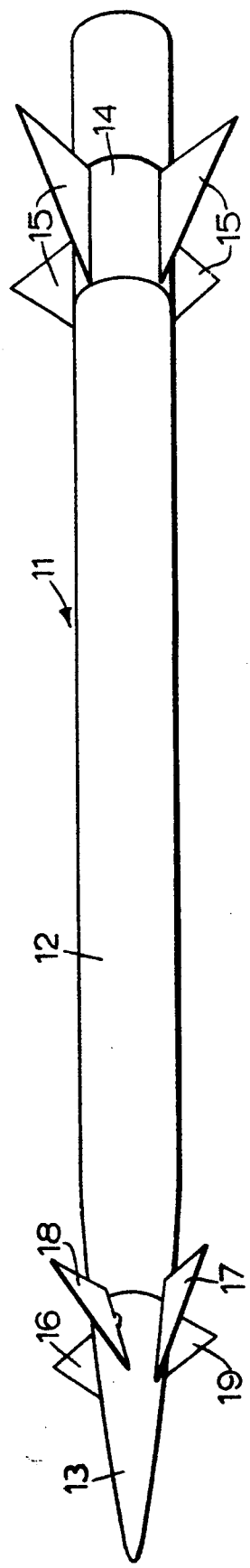

United States Patent [19]

Surman

[11] Patent Number: 5,398,886

[45] Date of Patent: Mar. 21, 1995

[54] CONTROL SYSTEMS FOR MISSILES AND OTHER MOVING BODIES

[75] Inventor: Colin R. Surman, Craigavad, Northern Ireland

[73] Assignee: Shorts Missile Systems Limited, Belfast, Northern Ireland

[21] Appl. No.: 512,825

[22] Filed: Dec. 3, 1965

[30] Foreign Application Priority Data

Dec. 9, 1964 [GB] United Kingdom ............ 50198

[51] Int. Cl.$^6$ .......................................... F41G 7/00
[52] U.S. Cl. .............................................. 244/3.21
[58] Field of Search ........................ 244/3.1–3.26; 318/20.310, 20.315, 20.746

Primary Examiner—Daniel T. Pihulic
Attorney, Agent, or Firm—Cushman, Darby & Cushman

[57] ABSTRACT

A control circuit having a difference unit to which first and second input signals are in operation applied to produce a signal representative of the differences between the two input signals, a logic circuit connected to receive a signal from the difference unit to produce in response to signals applied thereto exceeding a predetermined value in respect to a datum an output of a constant value equal to twice the said predetermined value and on the other side of the datum, an adding unit connected to receive the signal from the logic circuit and the signal from the difference unit to produce an output signal representative of the algebraic sum of the two signals applied to the adding unit, said switch means adapted to switch to a first condition in response to signals from the adding unit having values to one side of the datum and to switch to a second condition in response to signals from the adding unit having values to the other side of the datum.

7 Claims, 3 Drawing Sheets

CONTROL SYSTEMS FOR MISSILES AND OTHER MOVING BODIES

The present invention relates to control systems for missiles and other moving bodies and is particularly though not exclusively concerned with a remote control system for a missile as described in our copending U.S. patent application Ser. No. 373881/64, now abandoned.

In our copending U.S. patent application Ser. No. 373881/64 there is described a missile in which the nose portion is rotatably mounted in bearings on the forward end of a cylindrical main body portion of the missile for rotation about the longitudinal axis of the missile and is provided with a pair of aileron control surfaces and a pair of elevator control surfaces pivotally mounted on the nose portion, and a remote control system is employed by means of which an operator at a ground station can bring the nose portion of the missile to a preselected roll attitude by appropriate operation of the aileron control surfaces and then subject the missile to a lateral steering thrust by appropriate operation of the elevator control surfaces.

A space-stabilized gyroscope is mounted in the rotatable nose portion of the missile and in operation feeds to a comparator in the main body portion of the missile a signal the magnitude of which is representative of the roll attitude of the nose portion. From the ground station a signal is transmitted which is representative of a required roll attitude for the nose portion and this latter signal is applied to the comparator which produces an output signal representative of the difference between this signal and the signal from the gyroscope, and in response to an output signal from the comparator a switch is operated so as to set the aileron control surfaces in an attitude which will cause the nose portion to rotate from its present roll attitude to the required roll attitude. As the nose portion approaches the required roll attitude, the two signals fed to the comparator become equal and then differ from each other in the opposite sense with the result that the output signal from the comparator changes sign and causes the switch to switch over and move the aileron control surfaces to a deflected position causing rotation of the nose portion in the opposite sense. As the aileron control surfaces have no stable zero position, these surfaces then hunt about their undeflected positions with the result that the nose portion is held at the required roll attitude.

It will be appreciated that in bringing the rotatable nose portion of the missile to the required roll attitude a situation would from time to time arise in which the nose portion is required to turn through almost 360°. Some means are desirable which will ensure that the nose portion takes the shorter path to arrive at the required roll attitude and it is an object of the present invention to provide a control circuit in the missile by which the nose portion can be made to take the shorter path.

According to the present invention, there is provided a control circuit comprising a difference unit to which first and second input signals are in operation applied to produce a signal representative of the difference between the two input signal, a logic circuit connected to receive the signal from the difference unit to produce in response to signals applied thereto exceeding a predetermined value with respect to a datum an output of a constant value equal to twice the said predetermined value and on the other side of the datum, an adding unit connected to receive the signal from the logic circuit and the signal from the difference unit to produce an output signal representative of the algebraic sum of the two signals applied to the adding unit and switch means adapted to switch to a first condition in response to signals from the adding unit having values to one side of said datum and to switch to a second condition in response to signals from the adding unit having values to the other side of said datum.

In the preferred embodiment of the invention, the logic circuit is responsive to a signal applied to it exceeding a predetermined positive value with respect to said datum to produce an output signal of a constant negative value equal to twice the said predetermined positive value, and a further logic circuit is produced which is responsive to signals from the difference unit exceeding a predetermined negative value with respect to the datum to produce an output signal of a constant positive value equal to twice the predetermined negative value, the output signal from the further logic circuit being applied to the adding unit.

Figure 2:
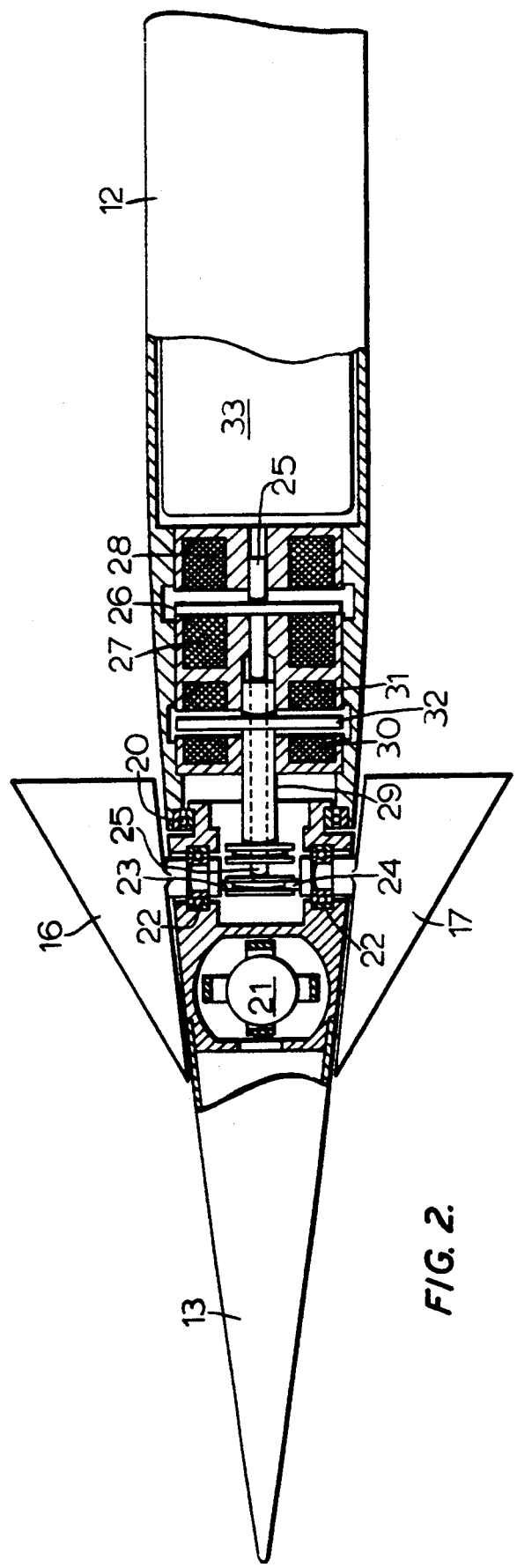
Figure 3:
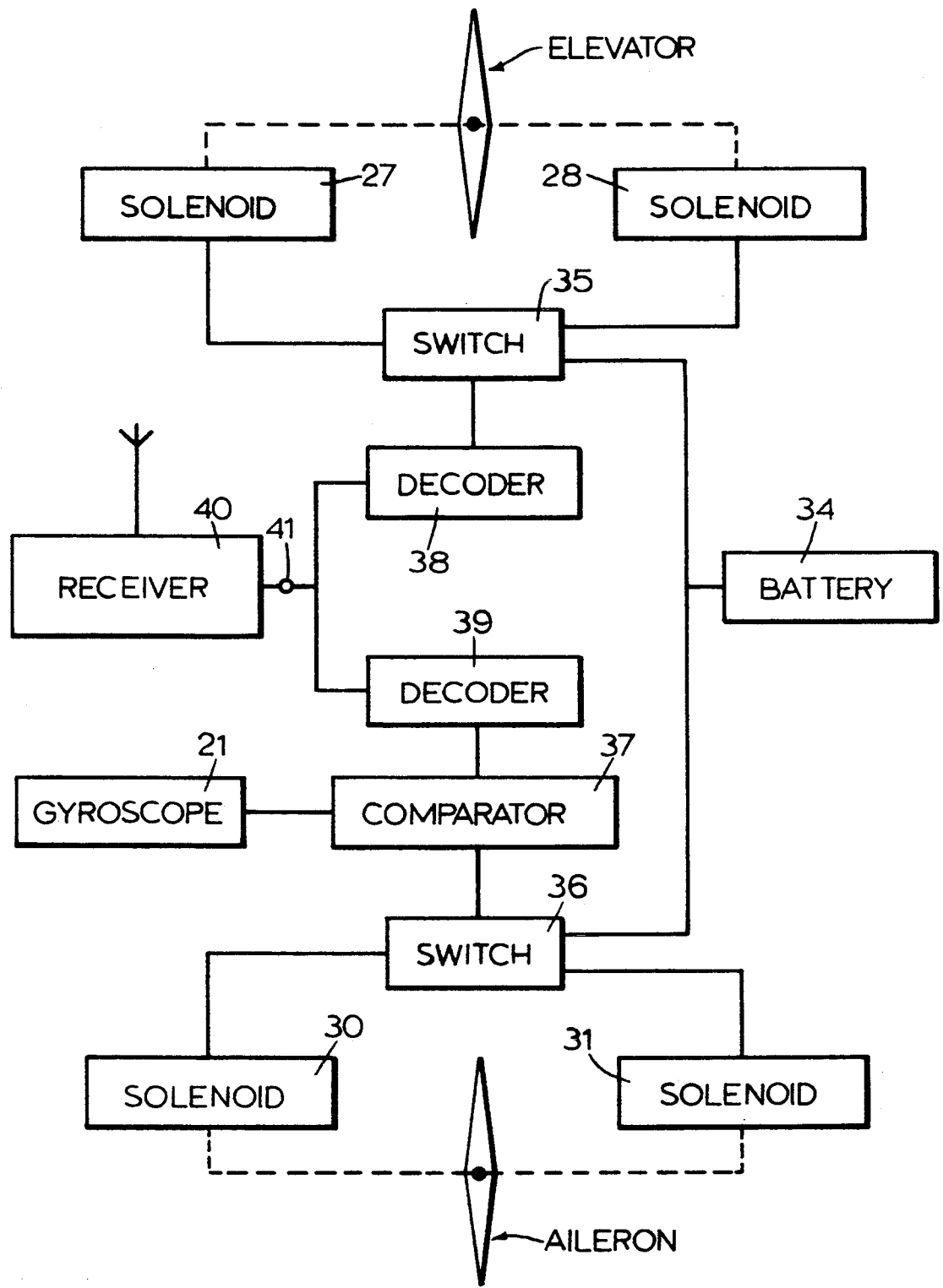
Figure 4:
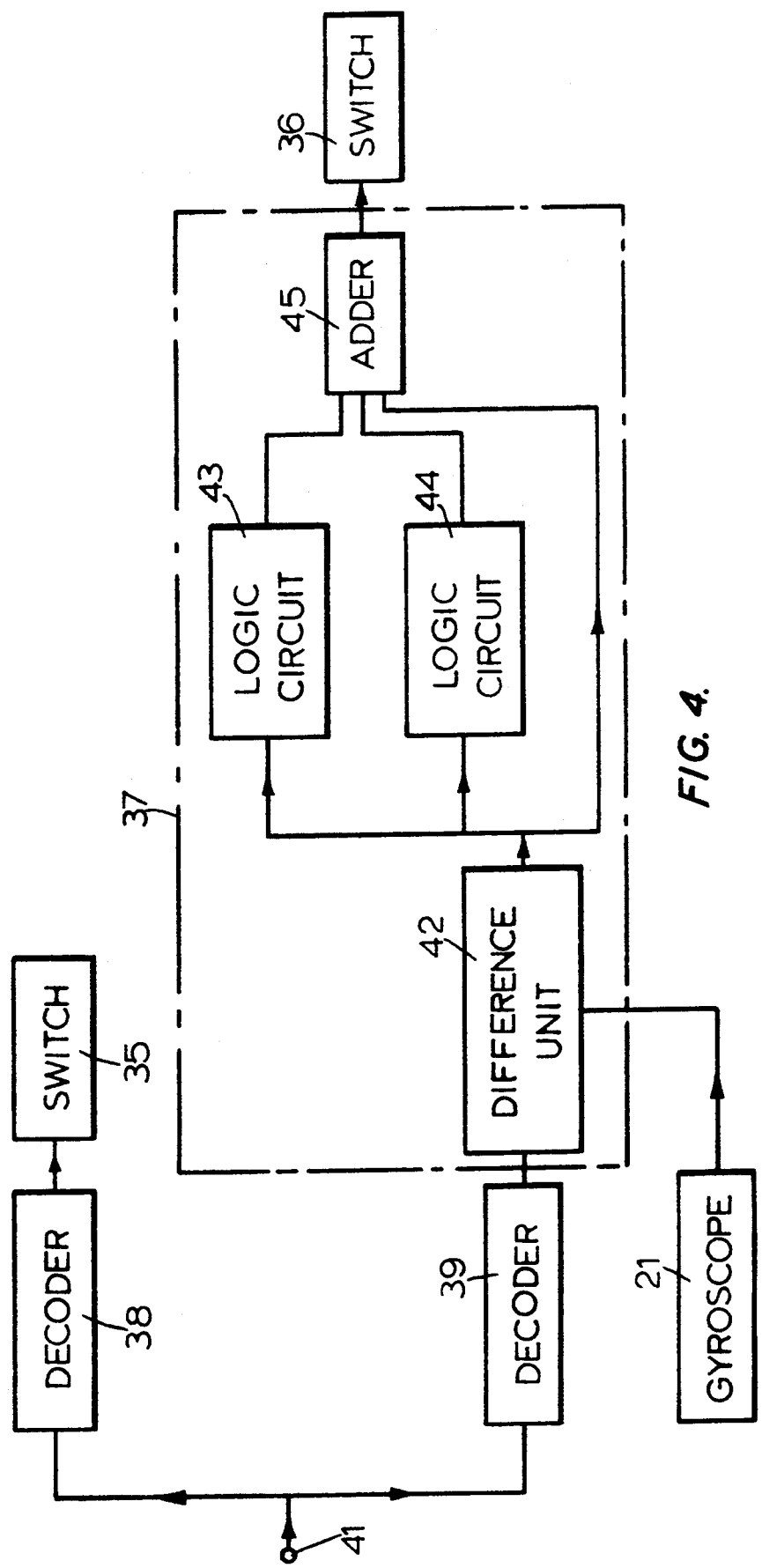

One embodiment of the invention will now be described by way of example with reference to the accompanying drawings in which:

FIG. 1 is a schematic perspective view of a missile as described in our copending Patent Application, FIG. 2 is a part sectional side elevation of a forward portion of the missile shown in FIG. 1, FIG. 3 is a schematic block diagram of control apparatus embodied in the missile shown in FIG. 1, and FIG. 4 is a block schematic diagram of a control circuit according to the invention and forming part of the apparatus shown in FIG. 3.

Referring first to FIGS. 1 and 2, a missile 11 comprises a main body portion 12, a nose portion 13 and a tail portion 14. The tail portion 14 carries fixed body stabilising fins 15 and is fixedly mounted on the main body portion 12. The nose portion 13 includes a pair of elevator control surfaces 16 and 17 and a pair of aileron control surfaces 18 and 19. As shown in FIG. 2, the nose portion 13 is rotatably mounted in bearings 20 on the forward end of the main body portion 12 and houses a free gyroscope 21 which is arranged to generate an electrical signal representative of the roll attitude of the nose portion.

The elevator control surfaces 16 and 17 are rotatably mounted in bearings 22 for rotation about a common lateral axis and the inner ends of the shafts supporting the control surfaces 16 and 17 are provided with eccentrically mounted pins 23 and 24 which engage in a peripheral groove in the head of a push rod 25 which extends into the nose portion 13 from the body portion 12. Within the body portion 12 the push rod 25 is formed with the diaphragm 26 which serves as an armature cooperating with a pair of solenoid coils 27 and 28 energised in a manner hereinafter to be described, the arrangement being such that upon energisation of the coils 27 and 28 in one sense the push rod 25 is moved forward into the nose portion, acting on the eccentric pins 23 and 26 and serving to bring the elevator control surfaces 16 and 17 to a deflected position, and upon energisation of the coils 27 and 28 in the opposite sense the push rod is moved to a retracted position causing the elevator control surfaces 16 and 17 to move to a deflected position in the opposite sense.

The aileron control surfaces 18 and 19 are controlled by push rod 29 within which the push rod 25 is slidably mounted, and the push rod 29 is controlled in the same manner as the push rod 25 by the action of a pair of solenoid coils 30 and 31 acting on a diaphragm 32 formed on the push rod 29, with the exception that the eccentric pins carried on the supporting shafts of the aileron control surfaces 18 and 19 are so arranged that the two control surfaces 18 and 19 move in opposite sense to deflected positions in response to either a forward or rearward movement of the push rod 29.

The coils 27, 28 and 30, 31 are energised under the control of apparatus 33 housed in the main portion 12 of the missile and this will now be described with references to FIG. 3. The control apparatus 33 comprises a battery 34, two switching units 35 and 36, a signal comparator 37 and signal decoders 38 and 39 which are fed with incoming signals received by a receiver 40. Energising current for the solenoid coils 27 and 28 is supplied by the battery 34 through the switch 35 which is controlled by a signal transmitted from a remote ground control station and detected by the decoder 38. Energising current for the solenoid coils 30 and 31 is supplied by the battery 34 through the switch 36 which is controlled by the output from the comparator 37 which compares the signal generated by the gyroscope 21 with a further signal transmitted from the control station and detected by the decoder 39. Each of the switches 35 and 36 is such that in a first condition current from the battery 34 is fed through the solenoid coils in one sense and in a second condition is fed through the coils in the opposite sense.

Referring now to FIG. 4, a mark-space signal for controlling the elevator control surfaces of the missile and hereinafter referred to as the lateral demand signal and a further mark-space signal for controlling the aileron control surfaces of the missile and hereinafter referred to as the roll demand signal are received by the receiver 40 and applied to an input terminal 41, the signals being transmitted from the ground station to the missile by any method well known in the art for example, the lateral demand signal appearing as a frequency modulation of a transmitted carrier oscillation and the roll demand signal appearing as an amplitude modulation of the carrier oscillation. The signals at the terminal 41 are fed to the decoder 38 which smoothes out the amplitude modulation and reconstitutes the mark-space signal from the frequency modulation, the latter signal being applied to the switch 35 which controls the solenoids actuating the elevator control surfaces.

The signals appearing at the input terminal 41 are also applied to the decoder 39 which produces from the amplitude modulation a DC output voltage proportional to the demanded roll angle. The DC signal from the decoder 39 is applied to a difference unit 42 to which is also applied the output signal generated by the gyroscope 21 housed in the nose portion of the missile. The signal produced by the gyroscope 21 is representative of the instantaneous roll attitude of the nose portion and for convenience it will be assumed that the gyroscope signal amplitude is in units with 0, 3, 6, 9 and 12 units representing 0°, 90°, 180°, 270° and 360° with respect to a fixed datum attitude and that the signal from the decoder 39 is in the same units.

The difference unit 42 is such as to produce an output signal the amplitude of which is a measure of the difference between the amplitudes of the signals applied to the unit, and the output signal from the unit 42 is fed to first and second logic circuits 43 and 44 and to an adding unit 45. The first logic circuit 43 is arranged to produce an output signal of −12 units when an input signal is applied thereto of +6 units or more and the second logic circuit 44 is arranged to produce an output signal of +12 units when the input signal thereto is −6 units or of more negative value.

The output signals from the logic circuits 43 and 44 are applied to the adding unit 45 which produces an output signal representative of the algebraic sum of the amplitude of the signals applied thereto and the output signal from the unit 45 is applied to the changeover switch 36 which switches into one of two conditions in response to a positive signal applied to it and switches to its other condition in response to a negative signal applied to it, the switch 36 controlling the operation of the actuating solenoids for the aileron control surfaces of the missile.

To facilitate the description of the operation of the circuit it will be assumed that the gyroscope 21 is in a roll attitude of +90° from a datum attitude and that the signal therefrom has an amplitude of +3 units. Assuming for the present that the nose portion is required to be brought to a roll attitude of less than +270° say +240° from the datum, the signal from the decoder 39 will be +8 units. The output signal from the difference unit 42 then becomes +5 units and neither logic circuit will be operated so that the output of the adding unit 45 will be +5 units. If it is assumed that positive angles are measured counterclockwise then the switch 36 is switched on by the positive signal to a position in which it sets the aileron control surfaces 18 and 19 in a condition causing counterclockwise rotation of the nose portion. As the nose portion 13 reaches the required roll attitude the signal from the gyroscope 21 becomes +8 units and the output from adding units 42 and 45 becomes zero. Switch 36 will then oscillate about its main mean position, maintaining the nose portion 13 in the demanded roll attitude.

If the nose portion 13 is again considered to be at an attitude of +90° i.e. a roll attitude signal from the gyroscope of +3 units, and a demanded attitude greater than 270°, say 300° i.e. +10 units, is produced by decoder unit 39, then the difference unit 42 produces an output signal of +7 units and logic current 43 operates to produce an output signal of −12 units. The latter signal is added to the output of +7 units from the differences unit 42 and an output signal of −5 units is produces by adding unit 45, which in turn operates switch 36 causing a clockwise rotation of the nose portion towards the datum attitude. As the gyroscope unit 21 reaches the datum its output signal becomes 0 and the signal from unit 45 has decreased to −2 units, maintaining the clockwise rotation. As the gyroscope 21 crosses the datum, its output signal changes to +12 units. The differences unit 42 now has an output signal of −2 units and the logic circuit 43 ceases to produce −12 units, the output of adding unit 45 therefore remains at −2 units and clockwise rotation is maintained until the nose portion 13 reaches the demanded attitude of +10 units when the outputs of difference unit 42 and adding unit 45 become 0.

It will be appreciated that the nose portion 13 has now rotated a total of +5 units across the datum due to the operation of the logic circuit, in preference to a rotation of +7 units in the opposite direction, where the logic circuit not incorporated.

The operation of logic circuit 44 is identical and would occur if the nose portion was say +270° (+9 units) and the demanded attitude was less than 90° (+3 units). The nose portion 13 would under these circumstances rotate in a counterclockwise direction across the datum and take up the demanded attitude.

A further function of the logic circuits is to enable the nose portion to maintain an attitude on or near the datum. The operation of this function can be understood as follows. Consider the system without the logic circuits and assume a demanded attitude slightly greater than +0 units. If a random disturbance occurs such that the nose portion is forced across the datum to an attitude represented by +12 units. (Theoretically this is the same attitude, but in practice a finite difference must occur), the output signal from difference unit 42 will now change from zero to −12 units and will cause switch 36 to operate producing a clockwise rotation of the nose portion, through an angle of 360°, until the demanded attitude of 0 is reached. As the system will be subjected to random forces and will tend to overshoot the demanded attitude the same operation will be repeated resulting in a continuous spinning of the nose portion in a clockwise direction. If now the logic circuits are incorporated and the same conditions assumed, when the output from the gyroscope 21 changes to +12 units the differences unit 42 will produce −12 units and logic circuit 44 will operate and produce an output signal of +12 units which gives an output signals of +0 units from adding unit 45, which in turn operates switch 36 and causes a counterclockwise rotation of the nose portion 13 across the datum to the +0 position, when logic circuit 44 ceases to operate, and the nose portion 13 is maintained at the demanded attitude. The operation of logic circuit 43 occurs had the demanded attitude been +12 units and the nose portion 13 forced to the +0 attitude.

It will be seen that continuous spinning of the nose portion 13 cannot occur with the logic circuits incorporated even should the decoder output be greater than +12 units or less than 0 units and that the nose portion 13 can maintain its attitude on or close to the datum.

Each of the logic circuits 43 and 44 may take the form of a conventional "Schmidt Trigger" circuit arranged to provide an output of zero for inputs below the trigger level and a voltage representing plus or minus 360° of roll for inputs above the trigger level. The trigger level in the present embodiment is a voltage representing minus or plus 180° of roll respectively.

What I claim as my invention and desire to secure by Letters Patent is:

1. A control circuit comprising a difference unit to which first and second input signals are in operation applied to produce a signal representative of the difference between the two input signals, a logic circuit connected to receive a signal from the differences unit to produce in response to signals applied thereto exceeding a predetermined value in respect to a datum an output of a constant value equal to twice the said predetermined value and on the other side of the datum, an adding unit connected to receive the signal from the logic circuit and the signal from the difference unit to produce an output signal representative of the algebraic sum of the two signals applied to the adding unit, and switch means adapted to switch to a first condition in response to signals from the adding unit having values to one side of said datum and to switch to a second condition in response to signals from the adding unit having values to the other side of said datum.

2. A circuit according to claim 1, wherein the logic circuit is responsive to a signal applied to it exceeding a predetermined positive value with respect to said datum to produce an output signal of a constant negative value equal to twice the said predetermined positive value, and wherein a further logic circuit is provided which is responsive to signals from the difference unit exceeding a predetermined negative value with respect to the datum to produce an output signal of a constant positive value equal to twice the said predetermined negative value, the output signal from the further logic circuit being applied to the adding unit.

3. A missile or other moving body comprising a rotatable portion arranged for rotation relative to another portion of the missile or body, a control circuit according to claim 2, and means for rotating said rotatable portion in one sense in response to said switch means switching to said first condition and in the opposite sense in response to said switch means switching to said second condition to bring said rotatable portion to any preselected positions in relation to a datum attitude, one of said two input signals being representative of the actual attitude of the rotatable portion with respect to said datum attitude, the other of said two input signals being representative of a required attitude for the rotatable portion with respect to said datum attitude, and the arrangement being such that the said rotatable portion is brought to the required attitude by rotation thereof via the shorter path.

4. A missile according to claim 3, comprising a gyroscope mounted in the rotatable portion and arranged to generate said one of the two input signals and a receiver mounted in the missile for receiving said other of the two input signals from a remote control station.

5. A missile according to claim 4, wherein said means for rotating said rotatable portion comprises a control surface movable between two positions in the first of which the aerodynamic forces acting on the control surface produce a component thrust attending to rotate said rotatable portion in one sense and in the second of which the aerodynamic forces acting on the control surface produce a component thrust tending to rotate said rotatable portion in the opposite sense and control means for moving said control surface to the one or other of the first and second position in respect to the switching of said switch means to the said first or second condition.

6. A missile according to claim 5, wherein said control surface is pivotally mounted on the rotatable portion of the missile for pivotal movement about a lateral axis and wherein a second control surface is arranged on the rotatable portion for pivotal movement about the same lateral axis as the first control surface, and wherein said two control surfaces are arranged to be turned in opposite senses under the control of said control means.

7. A missile according to claim 6, wherein said control means comprises an actuator mechanism movable in response to the energisation of an electromagnetic coil forming part of the mechanism and contained in the said other portion of the missile or body and arranged to be energised in one sense in response to the switching of said switching means to said first condition and to be energised in the opposite sense in response to the switching of said switch means to said second condition.

* * * * *